Jan. 15, 1929.  
P. L. FRANCK  
1,699,287  
AUTOMOBILE SIGNALING DEVICE  
Filed June 1, 1927  2 Sheets-Sheet 1
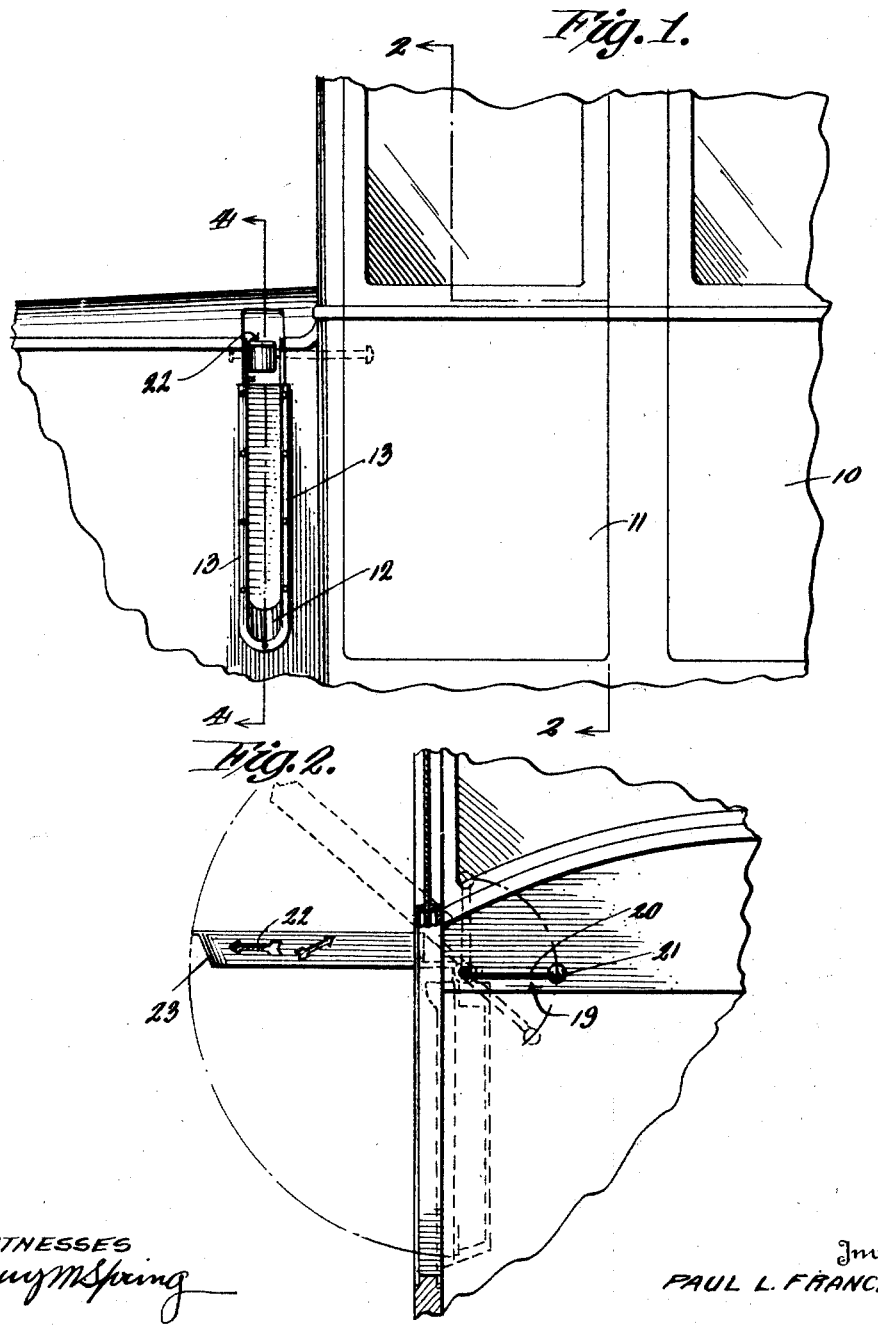
WITNESSES  
Guy M Spring
Inventor  
PAUL L. FRANCK  
By Richard B Owen, Attorney Jan. 15, 1929.
P. L. FRANCK
1,699,287
AUTOMOBILE SIGNALING DEVICE
Filed June 1, 1927  2 Sheets-Sheet 2
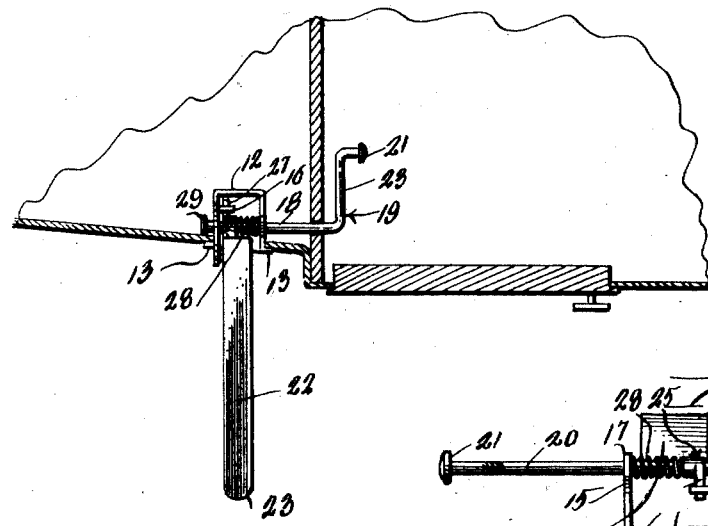
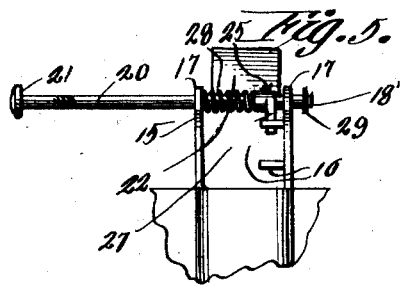
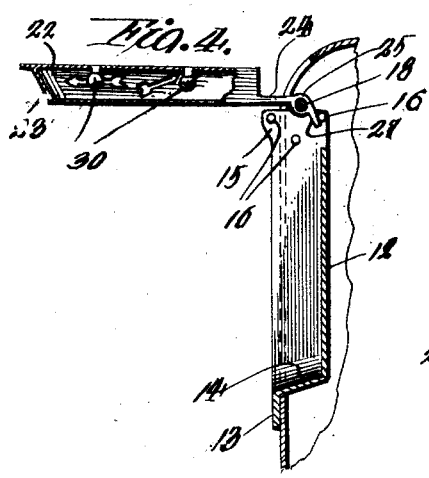
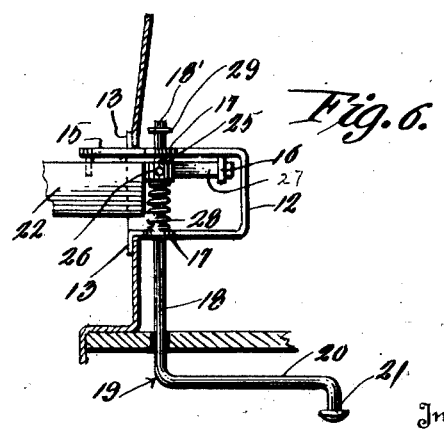
WITNESSES
Inventor
PAUL L. FRANCK
By Richard B. Owen, Attorney Patented Jan. 15, 1929.

1,699,287

UNITED STATES PATENT OFFICE.

PAUL L. FRANCK, OF SANTA BARBARA, CALIFORNIA.

AUTOMOBILE SIGNALING DEVICE.

Application filed June 1, 1927. Serial No. 195,879.

The present invention relates to improvements in signal apparatus and has for its primary object to provide a signal adapted for automobiles and designed to permit convenient signaling to designate the direction of travel.

A further object of the invention is the provision of an automobile signal arranged in convenient position so as to be readily operable by the operator of the vehicle and constructed so as to clearly indicate the intention of the driver.

Another object of the invention is the provision of a signal of the above character which will be normally disposed in an enclosed out of the way position when inoperative and which will be extended laterally of the vehicle when in use.

Still another object of the invention is the provision of an automoble signal which is simple and durable of construction, efficient for the purpose intended and which can be manufactured at a relatively low cost.

Other objects and advantages of the invention will become apparent as the description progresses.

In the accompanying drawings forming a part of this specification and in which like reference characters are employed to designate corresponding parts throughout the same:

Figure 1 is a fragmentary side elevational view of an automobile body illustrating the application of my improved signal structure in association therewith, Figure 2 is a vertical transverse sectional view of the device taken on the line 2—2 of Figure 1, Figure 3 is a top plan view of the signal structure shown in Figure 1, a horizontal section being taken through the adjacent portion of the car body, Figure 4 is a transverse sectional view taken on the line 4—4 of Figure 1.

Figure 5 is an enlarged side elevational view of the signal operating structure, and Figure 6 is a top plan view of the same.

Referring to the drawings wherein for the purpose of illustration is shown the preferred embodiment of my invention, the numeral 10 generally designates a fragmentary portion of an automobile body having a door 11 hingedly mounted on the side thereof. For the purpose of suitably carrying my improved signal, the body 10 is provided with a longitudinal vertically extending recess on the left hand side immediately forward of the door 11 as is clearly shown in Figures 1, 3, and 4.

Snugly fitted in the recess formed in the body 10 and arranged to receive a signal member in non-display position, is a casing 12 open at its outer side and provided with a marginal flange 13. The flange 13 is provided with a series of openings through which screws or bolts may be fitted for securely fastening the casing to the body. The lower end of the casing 12 is formed at a downward inclination as indicated at 14. The upper end of the casing 12 is formed to provide bearing brackets, one side terminating in a segmental bracket plate 15 carrying inwardly directed horizontal stop pins 16. This plate and the opposed side wall of the casing are formed, each at its top edge, with an upwardly extended ear 17, these ears being arranged in alignment and formed to receive a shaft 18 of an operating member 19.

The member 19, having the transversely extending shaft 18 extending through the bearing openings is provided with a crank 20 formed on one end, terminating in a knob 21.

The present apparatus further embodies a vertically swinging signal arm movable to various laterally extending positions to indicate the direction of travel intended by the operator of the vehicle on which the signal is mounted so as to signal traffic in the front and in the rear of the vehicle.

The signal arm embodies a longitudinal hollow body 22 rectangular in cross section one end being beveled and formed with a longitudinally extending lip 23 so that the signal arm will be snugly fitted in the casing 12 when in non-display position. The inner end of the signal arm is formed with a longitudinally extending bracket 24 terminating in a bearing sleeve 25 comprising an extension at one side thereof engageable with the shaft 19 of the operating member. The bearing sleeve 25 is provided with a threaded bore for receiving a set screw 26 for secure connection of the signal arm with the shaft. Attached or formed integral with the bearing sleeve 25 and projecting therefrom at an obtuse angle with respect to the bracket 24 is a finger 27 arranged to be selectively angaged with the pins 16 in the adjustment of the signal arm.

Positioned upon the shaft 18 and disposed between one bracket ear 17 and the bearing sleeve 25 of the signal arm is a coiled compression spring 28 designed to normally urge the signal arm toward one side of the casing structure adjacent the segmental plate 15. In this connection, it will be noted that the shaft 18 is provided with a lateral projection 18' on its forward end, this projection carrying a collar 29 adjacent its end to permit lateral sliding movement of the shaft and signal arm. As disclosed in Figures 2 and 4 of the drawings, the sides of the signal arm casing have cut out portions in the form of indicating arrows each side being formed with a pair of arrows, the outermost arrow being pointed toward the outer end of the casing while the innermost arrows are arranged at an angular inclination pointing toward the vehicle when the signal arm is in display position.

In use, when the vehicle is travelling between street intersections the signal arm 22 is arranged in a vertical position in the casing 12 while the arm crank 20 is extended upwardly as indicated in dotted lines in Figure 2. As the vehicle approaches an intersection and it is desirable to signal for a right or left-hand turn, the operator grasps the knob 21 of the crank arm and pulls upon the same to shift the shaft 8 in a rearward direction and then swings the arm inwardly in a vertical arc. When it is intended to make a left-hand turn, the signal arm is swung to a horizontal position as shown in full lines in Figure 2 and the operating member released causing the finger 27 to engage the inner one of the stop pins 16 to maintain the signal arm in this position until the completion of the turn. In making a right hand turn, the signal arm is swung to an upwardly inclined position as shown in dotted lines in Figure 2, whereupon release of the operating member will cause the finger 27 to engage the intermediate one of the stop pins 16 to maintain the signal arm in this signaling position. Thus, the operator of the vehicle can operate my improved signal structure conveniently and quickly without materially interfering with the usual operating of the car.

For the purpose of clearly distinguishing the direction arrows of the semaphore at night, I contemplate the installation of a pair of electric lamps 30 secured in the casing in position between the opposed arrows so as to illuminate the arrow formations. This construction will insure distinct vision of the semaphore during the day or at night and thereby greatly eliminate the danger of accidents.

It is to be understood that the form of my invention herewith shown and described is to be taken as the preferred embodiment of the same and that various changes as to the shape, size and arrangement of parts may be resorted to without departing from the spirit of the invention or the scope of the subjoined claims.

Having thus described my invention, what I claim is:

1. In a signal of the class described, a support, a signal arm mounted for swinging adjustment and for shifting adjustment with respect to the support, means operable to effect adjustment of said arm, and coacting means upon the support and the said arm mutually engageable, in one position of shifting movement of the arm, for holding said arm in its positions of swinging adjustment.

2. In a signal of the class described, a support, a shaft rotatably and shiftably mounted thereon, means associated with the shaft whereby it may be rotatably adjusted and shiftably adjusted, a signal arm mounted upon the shaft, and coacting means upon the support and said arm mutually engageable in one position of shifting movement of the shaft for holding said arm in positions of adjustment.

3. In a signal of the class described, a support, a shaft rotatably and shiftably mounted thereon, means associated with the shaft whereby it may be rotatably and shiftably adjusted, a signal arm fixed upon the shaft, fixed, spaced pins upon the support, and a locking finger fixed with respect to said arm and engageable with said pins selectively, in different positions of swinging adjustment of the arm, the said finger being movable into and out of position for engagement with said pins upon shifting adjustment of said shaft.

4. In a signal of the class described, a supporting casing open at one side, a shaft rotatably and shiftably mounted in the upper end of said casing, means operatively connected with one end of the shaft for effecting rotatable and shiftable adjustment of the shaft, a signal arm having an extension fixed upon the shaft and connecting the arm with the shaft whereby the said signal arm may be adjusted to angular display positions exteriorly of the casing, in the rotative adjustment of the shaft to different positions and to occupy a position within the casing, spaced stop elements upon the inner surface of one wall of the casing near the upper end thereof and concentric to the said shaft, and a finger extending from the extension of the signal arm and engageable selectively with the said stop elements to hold the arm in different positions of angular adjustment, the said finger being adjustable into and out of engagement with said stop elements upon shifting adjustment of said shaft.

5. In a signal of the class described, a supporting casing open at one side, a shaft rotatably and shiftably mounted in the upper end of said casing, means operatively connected with one end of the shaft for effecting rotatable and shiftable adjustment of the shaft, a signal arm having an extension fixed upon the shaft and connecting the arm with the shaft whereby the said signal arm may be adjusted to angular display positions exteriorly of the casing, in the rotative adjustment of the shaft to different positions and to occupy a position within the casing, spaced stop elements upon the inner surface of one wall of the casing near the upper end thereof and concentric to the said shaft, a finger extending from the extension of the signal arm and engageable selectively with the said stop elements to hold the arm in different positions of angular adjustment, the said finger being adjustable into and out of engagement with said stop elements upon shifting adjustment of said shaft, and a spring upon the shaft bearing against said extension of said arm and against the other side wall of said casing and yieldably holding the shaft normally shifted in position to effect engagement of the said finger with the said stop elements.

In testimony whereof I affix my signature.

PAUL L. FRANCK.